United States Patent
Ehrenberg et al.

(10) Patent No.: US 7,381,228 B2
(45) Date of Patent: Jun. 3, 2008

(54) MONO-, DI- OR TRICHROMATIC DYEING OR PRINTING OF NATURAL OR SYNTHETIC POLYAMIDE FIBER MATERIALS

(75) Inventors: Stefan Ehrenberg, Hattersheim (DE); Andreas Giehl, Niedernhausen (DE); Jörg Wörner, Bruchköbel (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 11/741,968

(22) Filed: Apr. 30, 2007

(65) Prior Publication Data

US 2007/0199162 A1 Aug. 30, 2007

Related U.S. Application Data

(62) Division of application No. 10/946,740, filed on Sep. 22, 2004.

(30) Foreign Application Priority Data

Sep. 24, 2003 (DE) ................................ 103 44 127

(51) Int. Cl.
*C09B 29/46* (2006.01)

(52) U.S. Cl. ....................... 8/692; 8/641; 8/669; 8/670; 8/681; 8/682; 8/687; 8/690

(58) Field of Classification Search .................... 8/641, 8/669, 692, 670, 681, 682, 687, 690
See application file for complete search history.

(56) References Cited

U.S. PATENT DOCUMENTS

| 4,693,727 A | 9/1987 | Bowles et al. |
| 5,611,821 A * | 3/1997 | Huang et al. ................. 8/549 |
| 5,944,855 A | 8/1999 | Lehmann et al. |
| 6,168,636 B1 | 1/2001 | Gröbel et al. |
| 6,190,423 B1 * | 2/2001 | Schumacher et al. .......... 8/549 |
| 6,238,442 B1 | 5/2001 | Schumacher et al. |
| 2003/0097721 A1 | 5/2003 | Schmiedl et al. |

FOREIGN PATENT DOCUMENTS

| EP | 1247842 A1 | 10/2002 |
| EP | 1 275 700 | 1/2003 |

* cited by examiner

*Primary Examiner*—Lorna M. Douyon
*Assistant Examiner*—Amina Khan
(74) *Attorney, Agent, or Firm*—Connolly Bove Lodge & Hutz LLP

(57) ABSTRACT

The present invention relates to processes for mono-, di- or trichromatic dyeing or printing of natural or synthetic polyamide fiber materials, these processes utilizing a) blue-dyeing dye mixture,
b) a red-dyeing dye mixture and/or
c) a yellow-dyeing dye mixture, and also blue-dyeing, red-dyeing and yellow-dyeing dye mixtures and processes for their preparation.

9 Claims, No Drawings

MONO-, DI- OR TRICHROMATIC DYEING OR PRINTING OF NATURAL OR SYNTHETIC POLYAMIDE FIBER MATERIALS

CROSS-REFERENCE TO RELATED APPLICATION

The present application is a divisional of U.S. patent application Ser. No. 10/946,740, filed Sep. 22, 2004, which is based on and claims priority to German Patent Application No. DE 103 44 127.1, filed Sept. 24, 2003.

The present invention relates to the field of reactive dyes and concerns processes for mono-, di- or trichromatic dyeing or printing of natural or synthetic polyamide fiber materials and dye mixtures which are useful for these processes.

EP 1 275 700 A2 describes a process for trichromatic dyeing and printing of synthetic polyamide fiber materials which is characterized in that it utilizes a red-dyeing reactive dye, a yellow- or orange-dyeing reactive dye and a blue-dyeing reactive dye.

Experience shows that, at least in the field of the mono-, di- and trichromatic dyeing and printing of wool, individual dyes have marked infirmities. The market is still looking for a satisfactory mono-, di- and trichromatic system for wool.

It has now been found that, surprisingly, this gap is filled when the blue, yellow and red color components each constitute mixtures of selected reactive dyes.

The present invention accordingly provides a process for mono-, di- or trichromatic dyeing and printing of natural and synthetic polyamide fiber materials, which comprises utilizing a) a blue-dyeing dye mixture comprising at least one dye of the general formula (I)

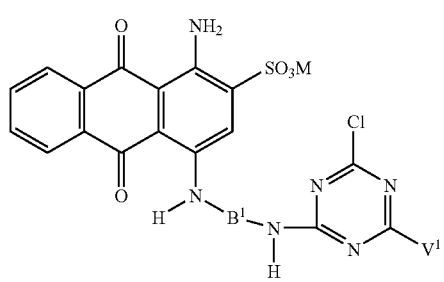
(I)

and at least one dye of the general formula (II)

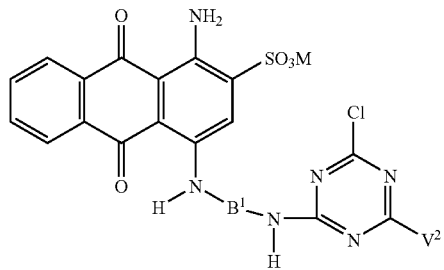
(II)

where
$B^1$ represents a group of the formula

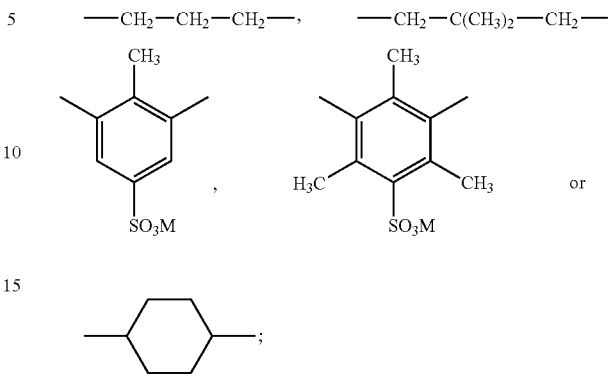

$V^1$ represents a group of the formula

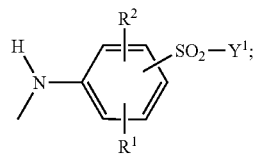

$V^2$ represents a group of the formula

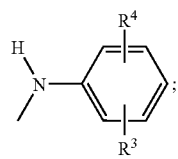

$R^1$, $R^2$ and $R^3$ independently represent hydrogen, methyl, methoxy or chlorine;
$R^4$ represents hydrogen or —$SO_3M$;
$Y^1$ represents vinyl or β-sulfatoethyl; and
M represents hydrogen, sodium or potassium;

and/or b) a red-dyeing dye mixture comprising at least one dye of the general formula (III)

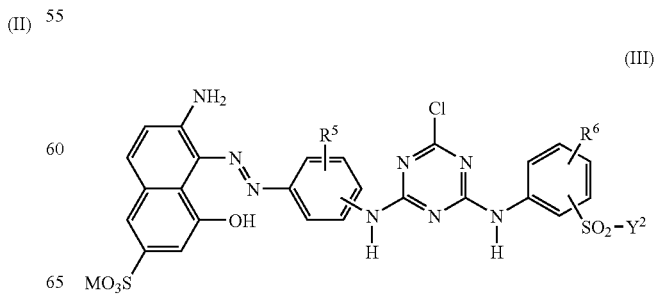
(III)

and at least one dye of the general formula (IV)

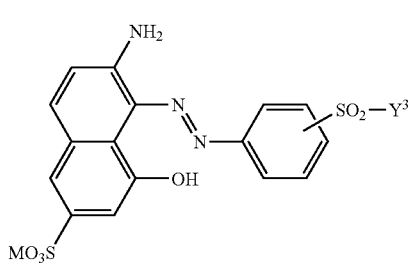

(IV)

where
- R⁵ represents hydrogen, —SO₃M, —COOM, methyl or chlorine;
- R⁶ represents hydrogen, methyl or methoxy;
- Y₂ and Y₃ independently represent vinyl or β-sulfatoethyl; and
- M represents hydrogen, sodium or potassium;

and/or
c) a yellow-dyeing dye mixture comprising at least one dye of the general formula (V)

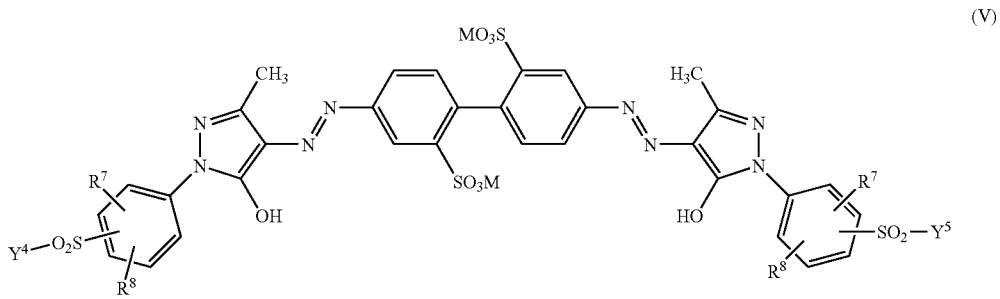

(V)

and at least one dye of the general formula (VI)

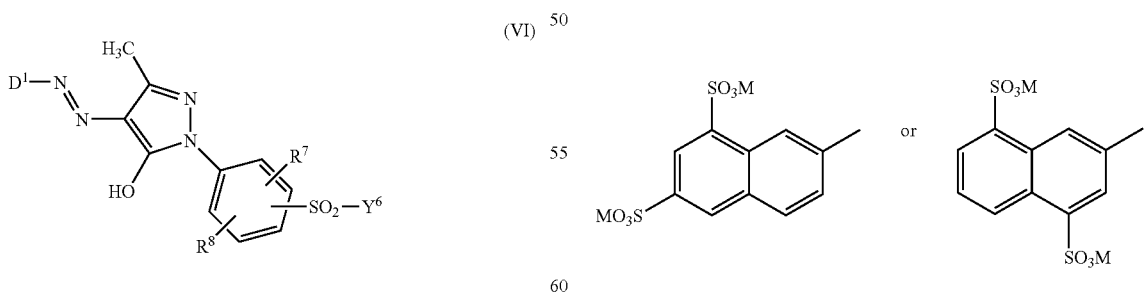

(VI)

where
- R⁷ and R⁸ represent hydrogen, methyl, methoxy or —SO₃M;
- Y⁴, Y⁵ and Y⁶ independently represent vinyl or β-sulfatoethyl;

D¹ represents a group of the formula

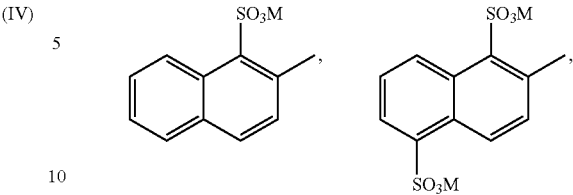

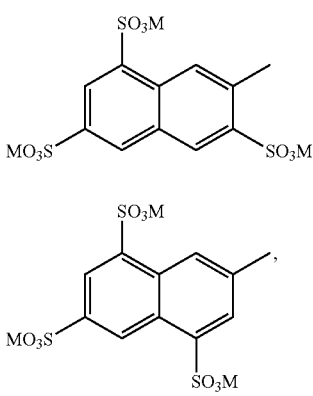

-continued and
M represents hydrogen, sodium or potassium.

In a preferred process according to the present invention, the blue-dyeing dye mixture a) as well as the dyes of the general formulae (I) and (II) further comprises a dye of the general formula (VII)

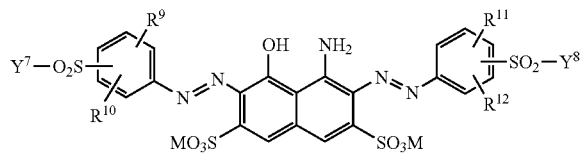
(VII)

where
R⁹, R¹⁰, R¹¹ and R¹² independently represent hydrogen, methyl, methoxy or chlorine;
Y⁷ and Y⁸ independently represent vinyl or β-sulfatoethyl; and
M represents hydrogen, sodium or potassium.

In a particularly preferred process according to the present invention, the blue-dyeing dye mixture a) comprises dyes of the general formulae (I), (II) and (VII) wherein the radicals R¹, R², R³, R⁹, R¹⁰, R¹¹ and R¹² represent hydrogen, R⁴ represents —SO₃M and B¹ represents a group of the formula

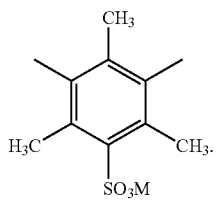

When the blue-dyeing dye mixtures a) comprise dyes of the general formulae (I) and (II) only, the fraction of dye of the general formula (I) is preferably in the range from 10% to 90% by weight and more preferably in the range from 20% to 80% by weight and the fraction of dye of the general formula (II) is preferably in the range from 10% to 90% by weight and more preferably in the range from 20% to 80% by weight, each percentage being based on the total dye content.

When the blue-dyeing dye mixtures a) as well as the dyes of the general formulae (I) and (II) further comprise dyes of the general formula (VII), the fraction of dye of the general formula (I) is preferably in the range from 20% to 70% by weight, the fraction of dye of the general formula (II) is preferably in the range from 10% to 50% by weight and the fraction of dye of the general formula (VII) is preferably in the range from 1% to 50% by weight, all percentages being based on the total dye content.

In a further preferred process according to the present invention, the red-dyeing dye mixture b) as well as the dyes of the general formulae (III) and (IV) further comprises a dye of the general formula (VIII)

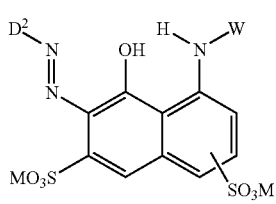
(VIII)

where
W represents a group of the formula

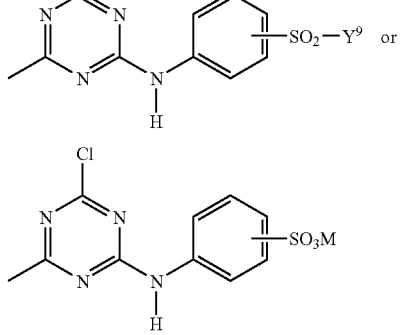

and may additionally represent a group of the formula

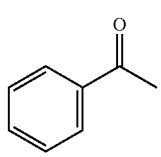

when D² comprises a fiber-reactive radical
Y⁹ represents vinyl or β-sulfatoethyl;
D² represents a group of the formula

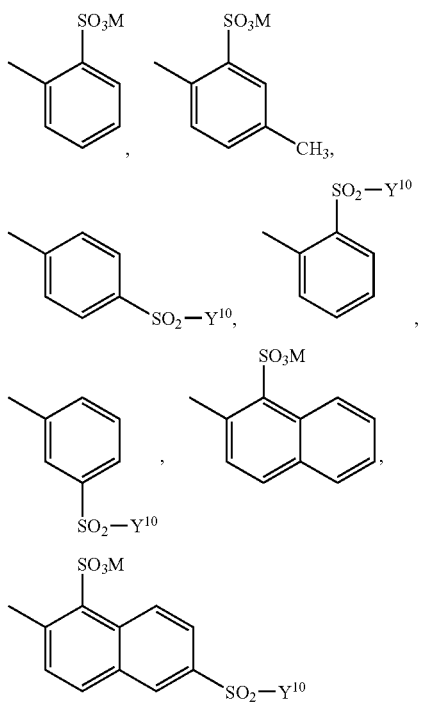

-continued

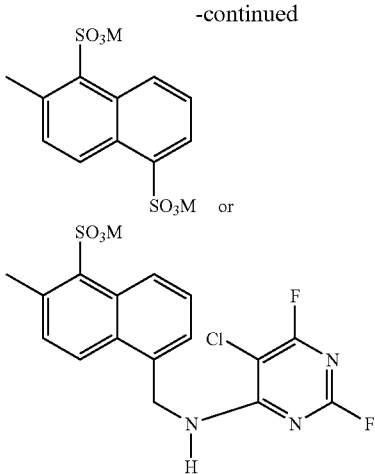

and

M represents hydrogen, sodium or potassium.

In a further particularly preferred process according to the present invention, the red-dyeing dye mixture b) comprises dyes of the general formulae (III), (IV) and (VIII) wherein
$R^5$ represents —SO$_3$M and $R^6$ represents hydrogen,
W represents a group of the formula

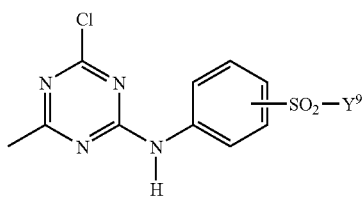

and $D^2$ represents a group of the formula

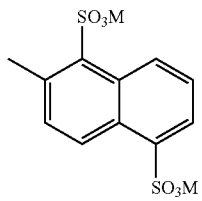

where $Y^9$ represents vinyl or β-sulfatoethyl and M represents hydrogen, sodium or potassium.

When the red-dyeing dye mixtures b) comprise dyes of the general formulae (III) and (IV) only, the fraction of dye of the general formula (III) is preferably in the range from 20% to 80% by weight and more preferably in the range from 30% to 75% by weight and the fraction of dye of the general formula (IV) is preferably in the range from 20% to 80% by weight and more preferably in the range from 25% to 70% by weight, each percentage being based on the total dye content.

When the red-dyeing dye mixtures a) as well as the dyes of the general formulae (III) and (IV) further comprise dyes of the general formula (VIII), the fraction of dye of the general formula (III) is preferably in the range from 30% to 60% by weight, the fraction of dye of the general formula (IV) is preferably in the range from 10% to 25% is by weight and the fraction of dye of the general formula (VIII) is preferably in the range from 30% to 45% by weight, all percentages being based on the total dye content.

In a further preferred process according to the present invention, the yellow-dyeing dye mixture c) as well as the dyes of the general formulae (V) and (VI) further comprises a dye of the general formula (IX)

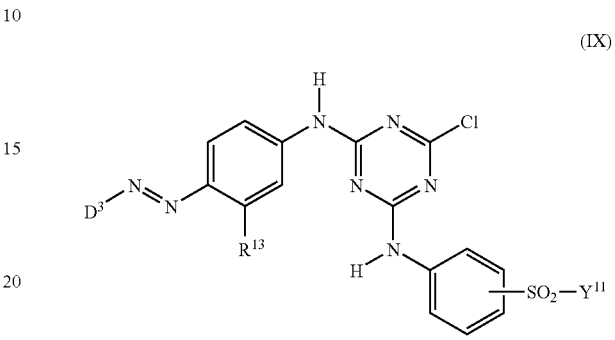

where
$R^{13}$ represents (C$_2$-C$_4$)-alkanoylamino, ureido, sulfamoyl or acetyl;
$Y^{11}$ represents vinyl or β-sulfatoethyl; and
$D^3$ has one of the meanings of $D^1$.

In a further particularly preferred process according to the present invention, the yellow-dyeing dye mixture c) comprises dyes of the general formulae (V) and (VI) wherein
$R^7$ and $R^8$ represent hydrogen;
$Y^4$, $Y^5$ and $Y^6$ represent vinyl or β-sulfatoethyl;
$D^1$ represents a group of the formula

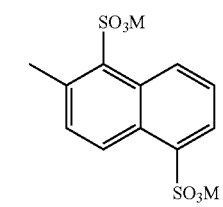

and

M represents hydrogen, sodium or potassium.

When the yellow-dyeing dye mixtures c) comprise dyes of the general formulae (V) and (VI) only, the fraction of dye of the general formula (V) is preferably in the range from 10% to 90% by weight and more preferably in the range from 50% to 80% by weight and the fraction of dye of the general formula (VI) is preferably in the range from 10% to 90% by weight and more preferably in the range from 20% to 85% by weight, each percentage being based on the total dye content.

When the red-dyeing dye mixtures b) as well as the dyes of the general formulae (V) and (VI) further comprise dyes of the general formula (IX), the fraction of dye of the general formula (V) is preferably in the range from 10% to 30% by weight, the fraction of dye of the general formula (VI) is preferably in the range from 20% to 50% by weight and the fraction of dye of the general formula (IX) is preferably in the range from 20% to 70% by weight, all percentages being based on the total dye content.

The dyes of the general formulae (I) to (IX) can be present in the form of mixtures of dyes which differ only in the meaning of the radicals $Y^1$ to $Y^{11}$. Consequently, the dyes of the general formulae (I) to (IX) can be present as a vinyl sulfone dye or as a β-sulfatoethylsulfonyl dye or as mixtures of the two. Preferably, the dyes of the general formulae (I) to (IX) are present as mixtures of vinyl sulfone dye and β-sulfatoethylsulfonyl dye in each of which the fraction of vinylsulfonyl dye to β-sulfatoethylsulfonyl dye is in a molar ratio between 2:98 and 98:2.

A preferred embodiment of the process according to the present invention utilizes a red-dyeing dye mixture b) comprising dyes of the general formulae (III), (IV) and (VIII) and a yellow-dyeing dye mixture c) comprising dyes of the general formulae (V), (VI) and (IX). The weight ratio between red-dyeing and yellow-dyeing dye mixture is preferably in the range from 1:10 000 to 10 000:1 and more preferably in the range from 1:1000 to 1000:1.

A further preferred embodiment of the process according to the present invention utilizes a blue-dyeing dye mixture a) comprising dyes of the general formulae (I), (II) and (VII) and a red-dyeing dye mixture b) comprising dyes of the general formulae (III), (IV) and (VIII). The weight ratio between blue-dyeing and red-dyeing dye mixture is preferably in the range from 1:10 000 to 10 000:1 and more preferably in the range from 1:1000 to 1000:1.

A further preferred embodiment of the process according to the present invention utilizes a blue-dyeing dye mixture a) comprising dyes of the general formulae (I), (II) and (VII) and a yellow-dyeing dye mixture c) comprising dyes of the general formulae (V), (VI) and (IX). The weight ratio between blue-dyeing and yellow-dyeing dye mixture is preferably in the range from 1:10 000 to 10 000:1 and more preferably in the range from 1:1000 to 1000:1.

A particularly preferred embodiment of the process according to the present invention utilizes a blue-dyeing dye mixture a) comprising dyes of the general formulae (I), (II) and (VII), a red-dyeing dye mixture b) comprising dyes of the general formulae (III), (IV) and (VII) and a yellow-dyeing dye mixture c) comprising dyes of the general formulae (V), (VI) and (IX). The weight ratio of the blue-dyeing, red-dyeing or yellow-dyeing dye mixture to the sum total of the two other dye mixtures used is preferably in the range from 1:10 000 to 10 000:1 and more preferably in the range from 1:1000 to 1000:1.

The process of the present invention can be implemented using the customary dyeing and printing processes described in the literature and known to one skilled in the art (see for example H.-K. Rouette, Handbuch der Textilveredelung, Deutscher Fachverlag GmbH, Frankfurt am Main).

The dyeing liquors and print pastes may contain further additives as well as the dyes of the general formulae (I) to (IX) and water. Additives are for example wetting agents, antifoams, leveling agents and agents which influence the properties of the textile material, such as softeners, flame retardants and soil, water and oil-repellent or water-softening agents. Especially print pastes may also comprise natural or synthetic thickeners, for example alginates and cellulose ethers.

The dye quantities in the dyebaths and print pastes can vary within wide limits, depending on the desired depth of shade. The amounts in which the dyes of the general formulae (I) to (IX) are present range in general from 0.01% to 15% by weight each and especially from 0.1% to 10% by weight each, based on weight of fiber and the print paste respectively.

The process of the present invention is preferably a dyeing process which is carried out by the exhaust method in particular. The dyeing pH is preferably in the range from 3 to 7 and especially in the range from 4 to 6. The liquor ratio can be within wide limits and is for example between 1:5 and 1:50 and preferably between 1:5 and 1:30. The dyeing temperature is preferably in the range from 70 to 110° C. and especially in the range from 80 to 105° C.

To enhance the wetfastnesses of the dyed material, unfixed dye can be removed in an aftertreatment. This aftertreatment is carried out in particular at a pH from 8 to 9 and temperatures of for example 75 to 85° C.

The process of the present invention, whether it is carried out as a dyeing process or as a printing process, is notable for uniform color buildup, good exhaustion and fixing performance and good hue consistency on the part of the dyes of the general formulae (I) to (IX). A particular advantage is the compatibility of the dyes mentioned, which is very good. The dyeings and prints obtained are also notable for good fastnesses, especially good rub-, wet-, wetrub- and lightfastnesses.

The process of the present invention is useful for dyeing and printing natural and synthetic polyamide fiber materials. Natural polyamide fiber material chiefly refers to wool, and here the process of the present invention is especially useful for machine-washable wool. Synthetic polyamide fiber materials are for example those composed of nylon-6 or nylon-6,6.

The polyamide fiber materials mentioned can be present in a wide range of processing forms, for example as fiber, yarn, woven fabric or formed-loop knitted fabric, but especially in the form of carpets.

Dye mixtures a), b) and c), utilized in the process of the present invention, are novel and likewise form part of the subject matter of the present invention.

This invention thus also provides a blue-dyeing dye mixture comprising at least one dye of the general formula (I)

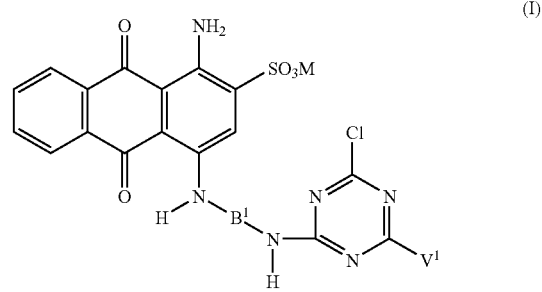

and at least one dye of the general formula (II)

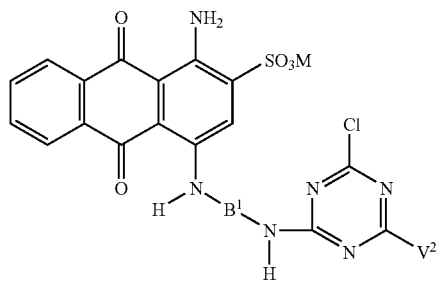

(II)

where
B¹ represents a group of the formula

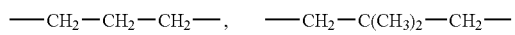

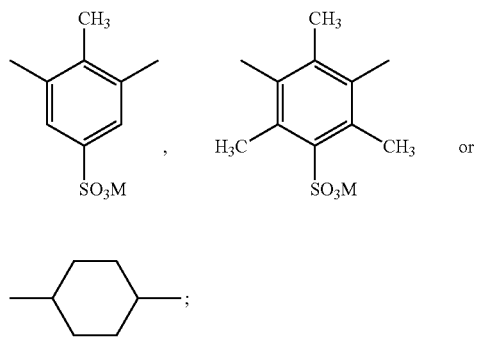

V¹ represents a group of the formula

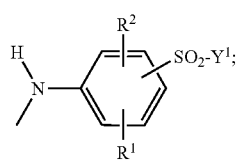

V² represents a group of the formula

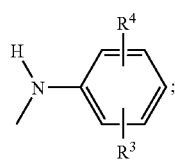

$R^1$, $R^2$ and $R^3$ independently represent hydrogen, methyl, methoxy or chlorine;
$R^4$ represents hydrogen or —$SO_3M$;
$Y^1$ represents vinyl or β-sulfatoethyl; and
M represents hydrogen, sodium or potassium.

The weight ratio of the dyes of the general formula (I) and (II) is preferably in the range from 1:9 to 9:1 and more preferably in the range from 1:4 to 4:1.

The blue-dyeing dye mixture of the present invention preferably further comprises a dye of the general formula (VII)

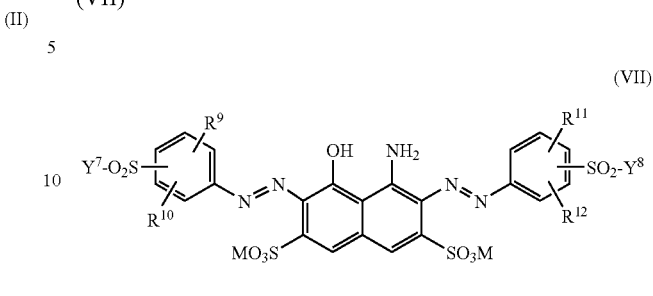

(VII)

where
$R^9$, $R^{10}$, $R^{11}$ and $R^{12}$ independently represent hydrogen, methyl, methoxy or chlorine;
$Y^7$ and $Y^8$ independently represent vinyl or β-sulfatoethyl; and
M represents hydrogen, sodium or potassium.

A particularly preferred blue-dyeing dye mixture according to the present invention comprises dyes of the general formulae (I), (II) and (VII) wherein the radicals $R^1$, $R^2$, $R^3$, $R^9$, $R^{10}$, $R^{11}$ and $R^{12}$ represent hydrogen, $R^4$ represents —$SO_3M$ and B¹ represents a group of the formula

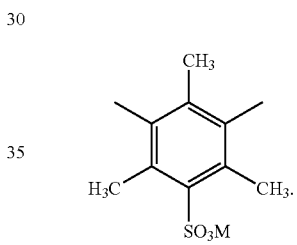

In blue-dyeing dye mixtures of the present invention which as well as the dyes of the general formulae (I) and (II) also comprise dye of the general formula (VII), the dye of the general formula (I) is preferably present in amounts from 20% to 70% by weight, the dye of the general formula (II) is preferably present in amounts from 10% to 50% by weight and the dye of the general formula (VII) is preferably present in amounts from 1% to 50% by weight, all percentages being based on the total dye content.

The present invention further provides a red-dyeing dye mixture comprising at least one dye of the general formula (III)

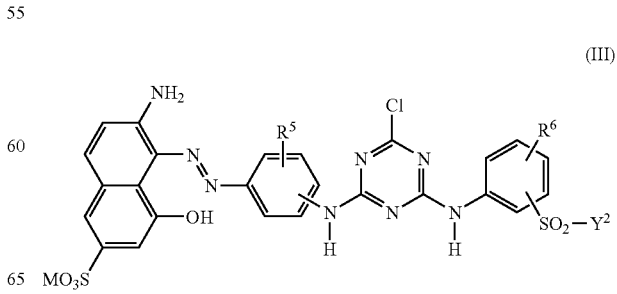

(III)

and at least one dye of the general formula (IV)

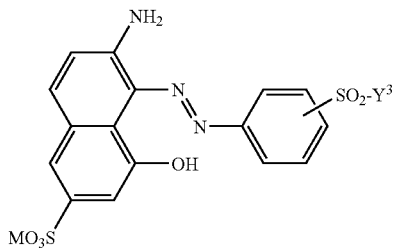
(IV)

where
- R⁵ represents hydrogen, —SO₃M, —COOM, methyl or chlorine;
- R⁶ represents hydrogen, methyl or methoxy;
- Y₂ and Y₃ independently represent vinyl or β-sulfatoethyl; and
- M represents hydrogen, sodium or potassium.

The weight ratio of the dyes of the general formula (III) and (IV) is preferably in the range from 1:4 to 4:1 and more preferably in the range from 1:2.3 to 3:1.

The red-dyeing dye mixture of the present invention preferably further comprises a dye of the general formula (VIII)

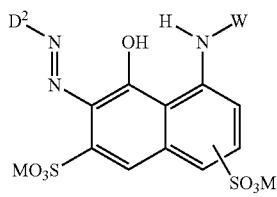
(VIII)

where
W represents a group of the formula

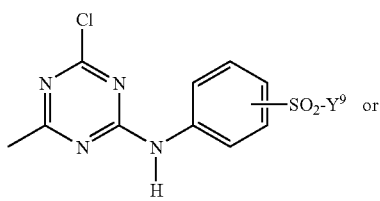

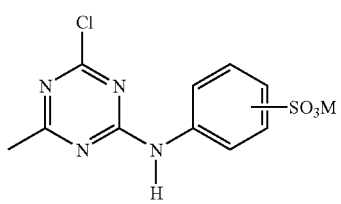

and may additionally represent a group of the formula

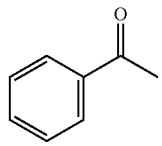

when $D_2$ comprises a fiber-reactive radical
$Y^9$ represents vinyl or β-sulfatoethyl;
$D^2$ represents a group of the formula

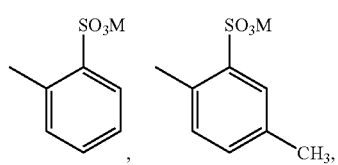

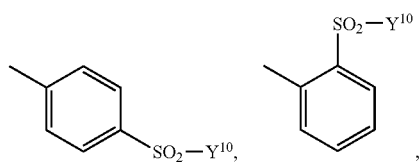

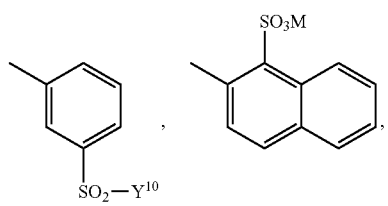

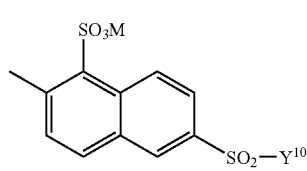

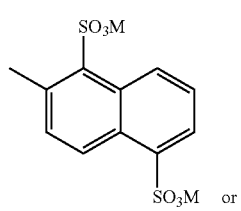 or

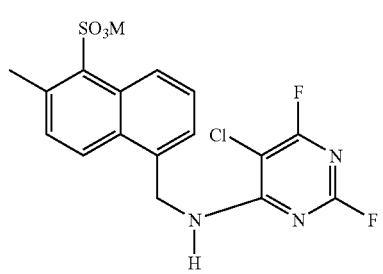

and
M represents hydrogen, sodium or potassium.

A particularly preferred red-dyeing dye mixture according to the present invention comprises dyes of the general formulae (III), (IV) and (VIII) wherein $R^5$ represents —$SO_3M$, $R^6$ represents hydrogen,
W represents a group of the formula

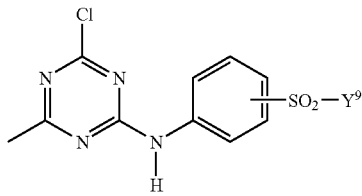

and $D^2$ represents a group of the formula

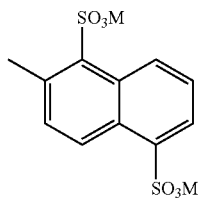

where $Y^9$ represents vinyl or β-sulfatoethyl and M represents hydrogen, sodium or potassium.

In red-dyeing dye mixtures of the present invention which as well as the dyes of the general formulae (III) and (IV) also comprise dye of the general formula (VIII), the dye of the general formula (III) is preferably present in amounts from 30% to 60% by weight, the dye of the general formula (IV) is preferably present in amounts from 10% to 25% by weight and the dye of the general formula (VIII) is preferably present in amounts from 30% to 45% by weight, all percentages being based on the total dye content.

The present invention finally also provides a yellow-dyeing dye mixture comprising at least one dye of the general formula (V)

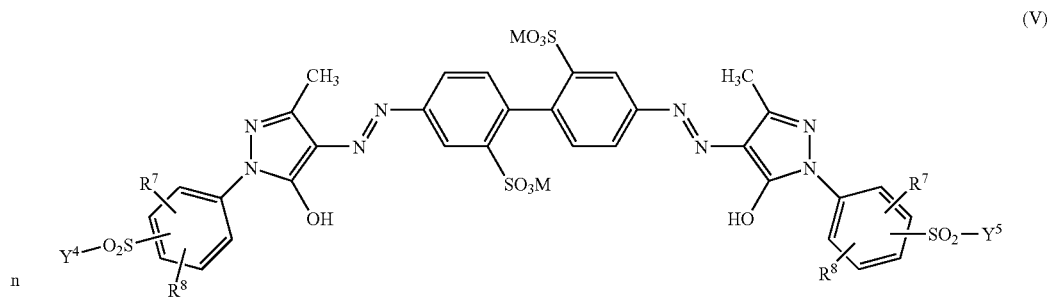

and at least one dye of the general formula (VI)

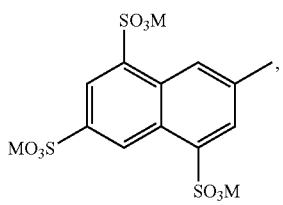

where
$R^7$ and $R^8$ represent hydrogen, methyl, methoxy or —$SO_3M$;
$Y^4$, $Y^5$ and $Y^6$ independently represent vinyl or β-sulfatoethyl;
$D^1$ represents a group of the formula

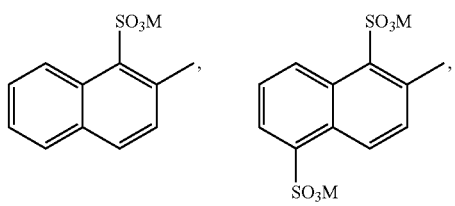

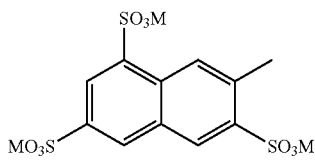

-continued

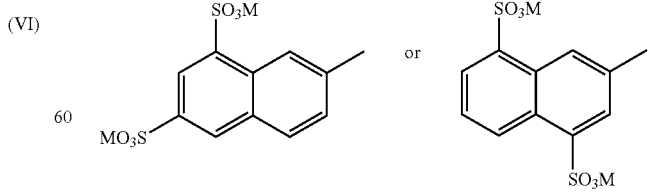

and
M represents hydrogen, sodium or potassium.

The weight ratio of the dyes of the general formula (V) and (VI) is preferably in the range from 1:9 to 9:1 and more preferably in the range from 1:5.7 to 4:1.

The yellow-dyeing dye mixture of the present invention preferably further comprises a dye of the general formula (IX)

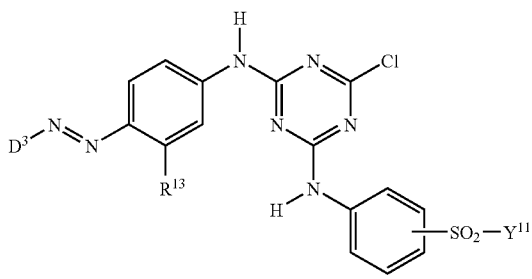

(IX)

where

R$^{13}$ represents (C$_2$-C$_4$)-alkanoylamino, ureido, sulfamoyl or acetyl;

Y$^{11}$ represents vinyl or β-sulfatoethyl; and

D$^3$ has one of the meanings of D$^1$.

A particularly preferred yellow-dyeing dye mixture according to the present invention comprises dyes of the general formulae (V) and (VI) wherein R$^7$ and R$^8$ represent hydrogen;

Y$^4$, Y$^5$ and Y$^6$ represent vinyl or β-sulfatoethyl;

D$^1$ represents a group of the formula

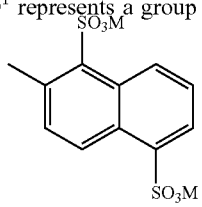

and

M represents hydrogen, sodium or potassium.

In yellow-dyeing dye mixtures of the present invention which as well as the dyes of the general formulae (V) and (VI) also comprise dye of the general formula (IX), the dye of the general formula (V) is preferably present in amounts from 10% to 30% by weight, the dye of the general formula (VI) is preferably present in amounts from 20% to 50% by weight and the dye of the general formula (IX) is preferably present in amounts from 20% to 70% by weight, all percentages being based on the total dye content.

The dye mixtures of the present invention can be present as a preparation in solid or liquid (dissolved) form. In solid form, they generally comprise the electrolyte salts customary in the case of water-soluble and especially fiber-reactive dyes, such as sodium chloride, potassium chloride and sodium sulfate, and may further comprise the assistants customary in commercial dyes, such as buffering substances capable of setting a pH between 3 and 8 in aqueous solution, such as sodium acetate, sodium borate, sodium bicarbonate, sodium dihydrogenphosphate and disodium hydrogenphosphate, small amounts of siccatives or solubilizers, such as the known naphthalenesulfonic acid-formaldehyde condensation products, or, when they are present in liquid, aqueous solution (including the presence of thickeners customary in the case of print pastes), substances which ensure the durability of these preparations, such as mold-preventing agents for example.

In general, the dye mixtures of the present invention are present as a dye powder which comprises electrolyte salt and has a total dye content in the range from 20% to 70% by weight, based on the dye powder or preparation. These dye powders/preparations may further comprise the abovementioned buffering substances in a total amount of up to 5% by weight, based on the dye powder.

When the dye mixtures of the present invention are present in aqueous solution, the total dye content of these aqueous solutions will be up to about 50% by weight, for example between 5% and 40% by weight, in which case the electrolyte salt content of these aqueous solutions is preferably below 10% by weight, based on the aqueous solution; the aqueous solutions (liquid preparations) may comprise the abovementioned buffering substances in an amount which is generally up to 5% by weight and preferably up to 2% by weight.

The present invention also provides processes for preparing the dye mixtures of the present invention.

These dye mixtures of the present invention are obtainable for example by mechanically mixing the individual dyes in the desired ratio. The individual dyes required for this purpose are known or can be prepared by known processes.

Alternatively, the dye mixtures of the present invention can be prepared by chemical synthesis. This is done for example by diazotizing a mixture of diazo components in the desired ratio and then coupling onto a coupling component. If desired, further dyes can be added to the resulting reaction solution in the desired ratio. The necessary diazotization and coupling reactions are known and form part of the tool kit of a person skilled in the art.

For example, a red-dyeing dye mixture according to the present invention can be prepared by a mixture of a diazo component of the general formula (X)

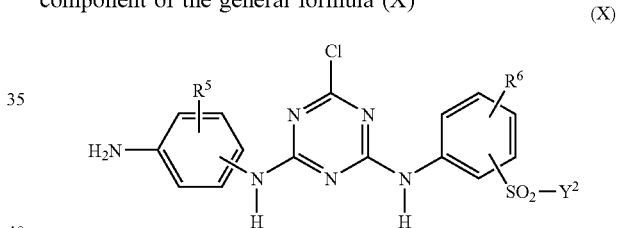

(X)

and of a diazo component of the general formula (XI)

(XI)

where R$^5$, R$^6$, Y$^2$ and Y$^3$ are as defined above, being conjointly diazotized and coupled onto the coupling component of the formula (XII)

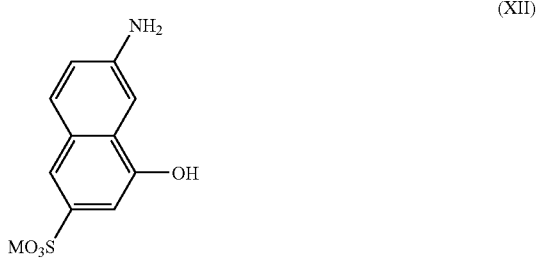

(XII)

where M is as defined above.

This reaction provides a dye mixture of the dyes of the general formulae (III) and (IV) which is in accordance with the present invention. When this dye mixture shall additionally comprise a dye of the general formula (VIII) it can be added to the as-coupled reaction solution in the desired ratio.

A yellow-dyeing dye mixture according to the present invention can be prepared for example by a mixture of a diazo component of the general formula (XIII)

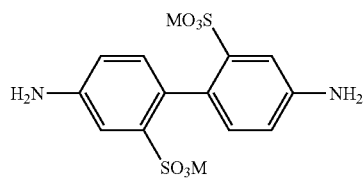
(XIII)

and of a diazo component of the general formula (XIV)

D¹-NH₂ (XIV)

where M and D¹ are as defined above, being conjointly diazotized and coupled onto the coupling component of the general formula (XV)

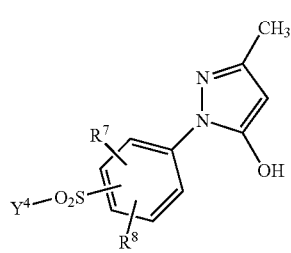
(XV)

where R⁷, R⁸ and Y⁴ are as defined above.

This reaction provides a dye mixture of the dyes of the general formulae (V) and (VI) which is in accordance with the present invention. When this dye mixture shall additionally comprise a dye of the general formula (IX) it can be added to the as-coupled reaction solution in the desired ratio.

Finally, the preparation of a blue-dyeing dye mixture according to the present invention is accomplished for example by reacting a compound of the general formula (XVI)

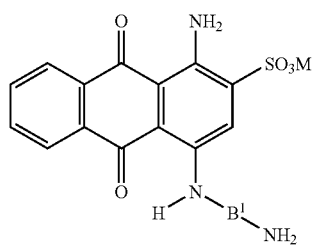
(XVI)

where B¹ and M are as defined above, with 1,3,5-trichlorotriazine in a conventional manner to form a compound of the general formula (XVII)

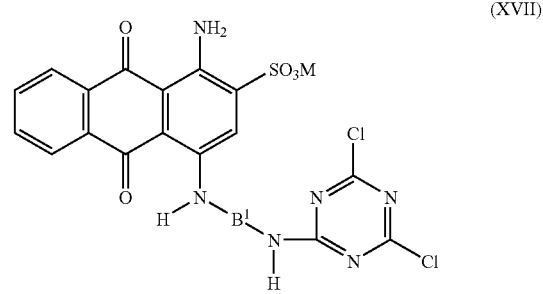
(XVII)

and further in a conventional manner reacting with a mixture in the desired mixing ratio of the compounds of the general formulae (XVIII) and (XIX)

H—V¹ (XVIII)

H—V² (XIX)

where V¹ and V² are as defined above.

This reaction provides a dye mixture of the dyes of the general formulae (I) and (II) which is in accordance with the present invention. When this dye mixture shall further comprise a dye of the general formula (VII), it can be added in the desired ratio to the reaction solution obtained in the course of the reaction with the compounds of the general formulae (XVIII) and (XIX).

The compounds of the general formulae (X) to (XIX) that are needed to prepare dye mixtures according to the present invention are known or preparable by known processes.

The examples which follow serve to illustrate the invention. Parts and percentages are by weight, unless otherwise stated. Parts by weight relate to parts by volume as the kilogram relates to the liter. The compounds described by formulae in the examples are written in the form of the sodium salts, since they are generally prepared, isolated and used for dyeing in the form of their salts, preferably sodium or potassium salts. The starting compounds mentioned in the following examples, especially table examples, can be used in the synthesis in the form of the free acid or likewise in the form of their salts, preferably alkali metal salts, such as sodium or potassium salts.

PREPARATION EXAMPLE 1

A solution of 281.3 parts of 4-(β-sulfatoethylsulfonyl)aniline in 800 parts of water having a pH of 4-4.5 is added over 30 min to a suspension of 188 parts of cyanuric chloride in 1000 parts of water and 1000 parts of ice. The acylation is conducted at a temperature of 10-13° C. and a pH of 4.1-4.2. After the reaction has ended, 188.2 parts of 2,4-diaminoanilinesulfonic acid are added.

The next acylation is performed at a temperature of 20° C. and a pH of 6.2 to 6.3. After the reaction has ended, 140.6 parts of 4-(β-sulfatoethylsulfonyl)aniline are sprinkled in.

The reaction mixture is diazotized at 12° C. and pH 0.8-0.9 by addition of 268 parts of 40% aqueous sodium nitrite solution. After the reaction has ended, 351.7 parts of 7-amino-1-naphthol-3-sulfonic acid are sprinkled into the reaction mixture. The coupling is carried out at a pH of 3.5 and 20° C. After the reaction has ended, the pH is set to 6.0. Evaporating this dye solution gives a dye mixture which provides red dyeings and prints on wool and nylon.

The dye mixture comprises 897.0 parts of a dye of the formula (IIIa)

(IIIa)

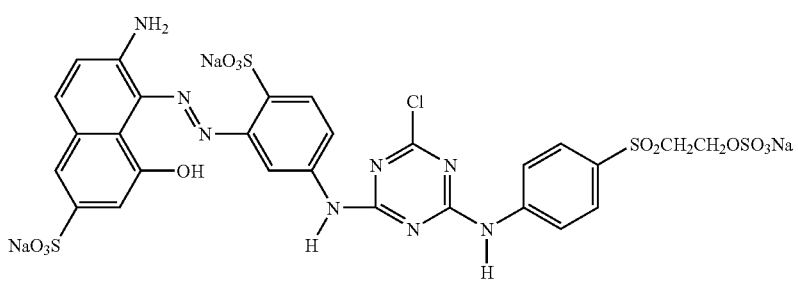

and 288 parts of a dye of the formula (IVa)

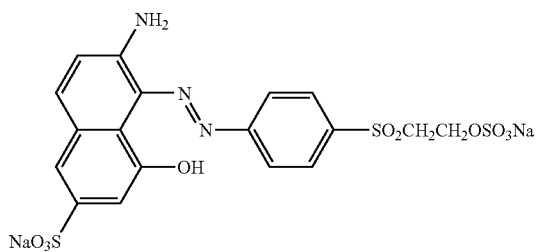

(IVa)

Alternatively, the dye solution obtained can also be buffered at pH 5.5-6 by addition of a phosphate buffer and be further diluted or concentrated to provide a liquid brand of defined strength.

PREPARATION EXAMPLE 2

A solution of 281.3 parts of 4-(β-sulfatoethylsulfonyl)aniline in 800 parts of water having a pH of 4-4.5 is added over 30 min to a suspension of 188 parts of cyanuric chloride in 1000 parts of water and 1000 parts of ice. The acylation is conducted at a temperature of 10-13° C. and a pH of 4.1-4.2. After the reaction has ended, 188.2 parts of 2,4-diaminoanilinesulfonic acid are added.

The next acylation is performed at a temperature of 20° C. and a pH of 6.2 to 6.3. After the reaction has ended, 140.6 parts of 4-(β-sulfatoethylsulfonyl)aniline and an aqueous solution comprising 92 g of 4-vinylsulfonylaniline are added.

The reaction mixture is diazotized as normal at 12° C. and pH 0.8-0.9 by addition of 357 parts of 40% aqueous sodium nitrite solution. After the reaction has ended, 478 parts of 7-amino-1-naphthol-3-sulfonic acid are sprinkled into the reaction mixture. The coupling is carried out at a pH of 3.5 and 20° C. After the reaction has ended, the pH is set to 6.0.

Evaporating this dye solution gives a dye mixture which provides red dyeings and prints on wool and nylon.

The dye mixture comprises 897 parts of the dye of the formula (IIIa), 288 parts of the dye of the formula (IVa) and 239 parts of the dye of the formula (IVb)

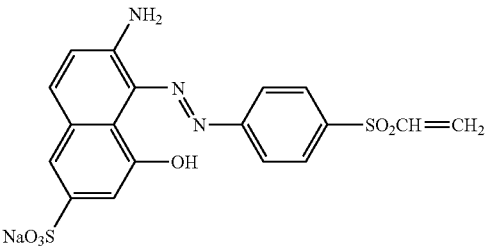

(IVb)

PREPARATION EXAMPLE 3

In the reaction solution obtained as per Preparation Example 1 are dissolved 987 parts of an electrolyte-containing dye powder which includes the red azo dye of the formula (VIIIa)

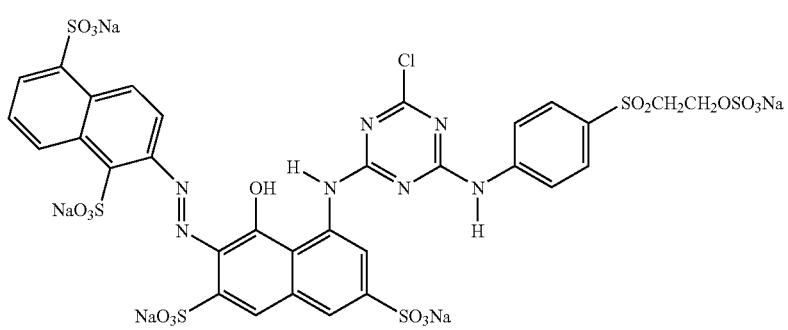

(VIIIa)

in a 50% fraction.

The dye solution obtained is adjusted to pH 5.5-6.5. Evaporating this dye solution gives a dye mixture which provides red dyeings and prints on wool and nylon.

PREPARATION EXAMPLE 4

52 parts of an electrolyte dye powder which includes the red azo dye of the formula (IIIa) in a 70% fraction and 13 parts of an electrolyte-containing dye powder which includes the red azo dye of the formula (IVa) in a 70% fraction and 35 parts of an electrolyte-containing dye powder which includes the red azo dye of the formula (IVb) in a 70% fraction are mechanically mixed with each other. The resulting dye mixture according to the present invention provides red dyeings and prints on wool and nylon.

PREPARATION EXAMPLE 5

128 parts of an electrolyte-containing dye powder which includes the red azo dye of the formula (IIIb)

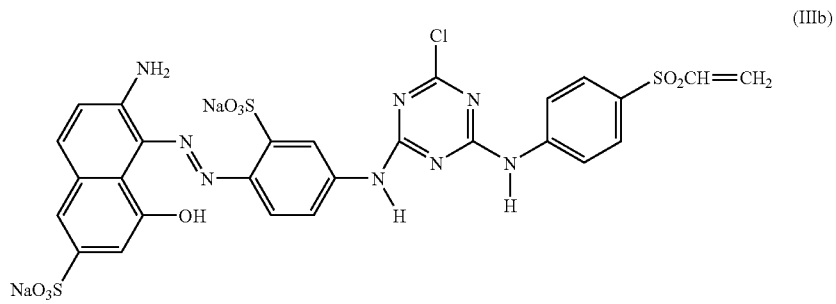
(IIIb)

in a 70% fraction, 41 parts of an electrolyte-containing dye powder which includes the red azo dye of the formula (IVa) in a 70% fraction are mechanically mixed with each other. The resulting dye mixture according to the present invention provides red dyeings and prints on wool and nylon.

PREPARATION EXAMPLE 6

A solution of 229 parts of benzidine-2,2'-disulfonic acid and 202 parts of to 2-naphthylamine-1,5-disulfonic acid in 2800 parts of water having a pH of about 5.5 is admixed with 345 parts of a 40% sodium nitrite solution. The resulting solution is added dropwise to a mixture of 2000 parts of ice and 580 parts of 31% hydrochloric acid. After the reaction has ended, excess sodium nitrite is removed. To the diazotization mixture are added 724 parts of 1-(4-[β-sulfatoethylsulfonyl]phenyl)-5-hydroxy-3-methyl-1H-pyrazole. The coupling is completed at pH 4.0 and a temperature of 40-45° C. by addition of 15% sodium carbonate solution. Evaporating this dye solution gives a dye mixture which comprises 784 parts of a dye of the formula (Va)

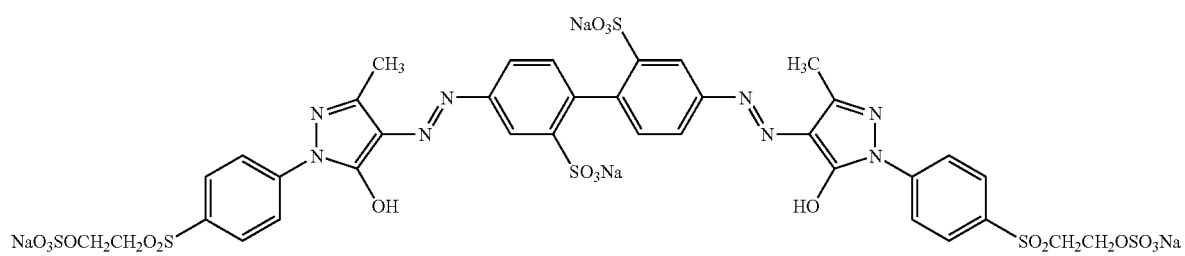
(Va)

and 446 parts of a dye of the formula (VIa)

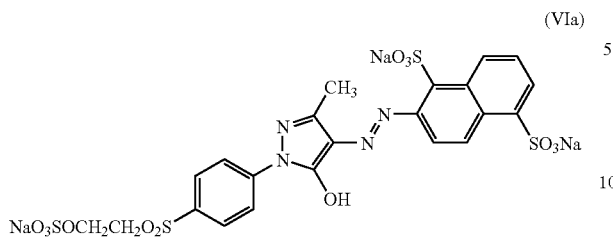
(VIa)

The dye mixture obtained dyes wool and nylon in yellow shades.

PREPARATION EXAMPLE 7

In the pre-evaporation reaction mixture of Preparation Example 6 are dissolved 2900 parts of an electrolyte-containing dye powder which includes the yellow azo dye of the formula (IXa)

The pH is adjusted to 6.0 and the solution evaporated to give a dye mixture which provides yellow dyeings and prints on wool and nylon.

PREPARATION EXAMPLE 8

57 parts of an electrolyte dye powder which includes the yellow azo dye of the formula (IXa) in a 60% fraction and 14 parts of an electrolyte-containing dye powder which includes the yellow azo dye of the formula (Va) in a 60% fraction and 29 parts of an electrolyte-containing dye powder which includes the yellow azo dye of the formula (VIa) in a 50% fraction are mechanically mixed with each other.

The resulting dye mixture according to the present invention provides yellow dyeings and prints on wool and nylon.

PREPARATION EXAMPLE 9

57 parts of an electrolyte-containing dye powder which includes the yellow azo dye of the formula (IXb)

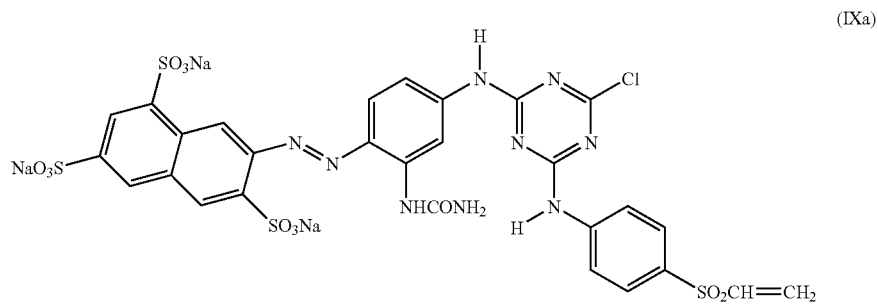
(IXa)

in a 60% fraction.

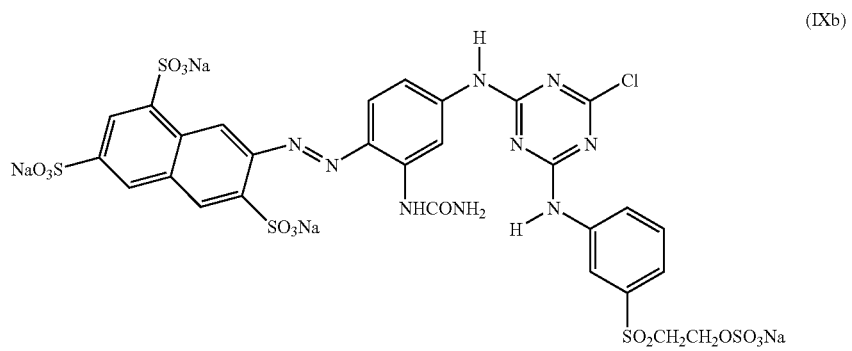
(IXb)

in a 50% fraction, 14 parts of an electrolyte-containing dye powder which includes the yellow azo dye of the formula (Va) in a 60% fraction and 29 parts of an electrolyte-containing dye powder which includes the yellow azo dye of the formula (VIb)

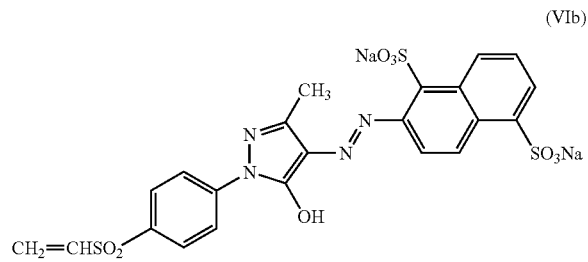

(VIb)

in a 70% fraction are mechanically mixed. The resulting dye mixture according to the present invention provides yellow dyeings and prints on wool and nylon.

PREPARATION EXAMPLE 10

75 parts of an electrolyte-containing dye powder which includes the yellow azo dye of the formula (IXc)

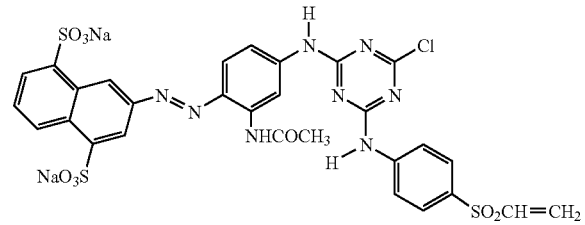

(IXc)

in a 50% fraction, 10 parts of an electrolyte-containing dye powder which includes the yellow azo dye of the formula (Va) in a 60% fraction and 20 parts of an electrolyte-containing dye powder which includes the yellow azo dye of the formula (VIa) in a 50% fraction are mechanically mixed.

The resulting dye solution according to the present invention provides yellow dyeings and prints on wool and nylon.

PREPARATION EXAMPLE 11

159.3 parts of 1-amino-4-(2',4',6'-trimethyl-3'-amino-5'-sulfophenyl-1-) amino-anthraquinone-2-sulfonic acid are dissolved in 550 parts of water using 20% sodium hydroxide solution at a pH of 6.5-7.0. The solution is added over 30 min to a suspension of 58.7 parts of cyanuric chloride, 225 parts of ice and 0.4 parts of Leophen dispersant in 225 parts of water. The acylation is conducted at a temperature of 0-5° C. and a pH of 6.5-7.0. After the reaction has ended, 59 parts of 4-(β-sulfatoethylsulfonyl)aniline and 17.2 parts of aniline-3-sulfonic acid are added. The next acylation is performed at a pH of 5.5-6.0 and a temperature of 60-65° C.

After the reaction has ended, evaporation of this dye solution gives a dye mixture which comprises 79.7 parts of a dye of the formula (IIa)

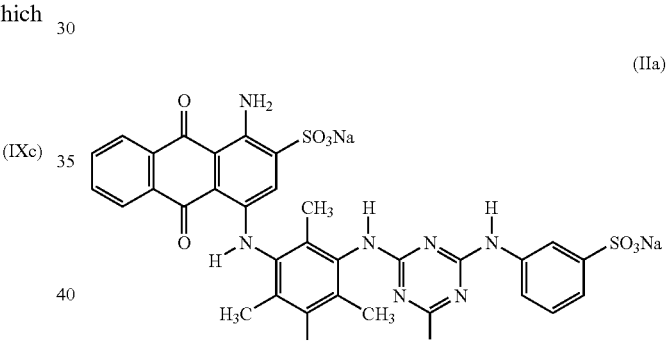

(IIa)

and 208.0 parts of a dye of the formula (Ia)

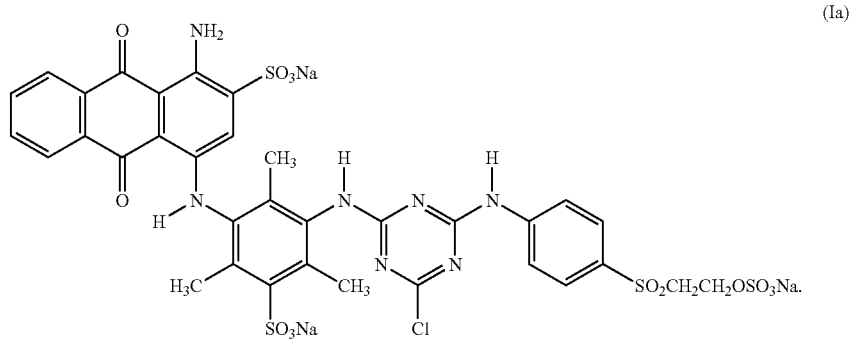

(Ia)

The dye mixture provides blue dyeings and prints on wool and nylon.

Alternatively, the dye solution obtained can be formulated as a liquid brand of defined strength by further dilution or concentration.

EXAMPLE 12

In the reaction solution obtained in Example 11 are dissolved 41 parts of an electrolyte-containing dye powder which includes the blue azo dye of the formula (VIIa)

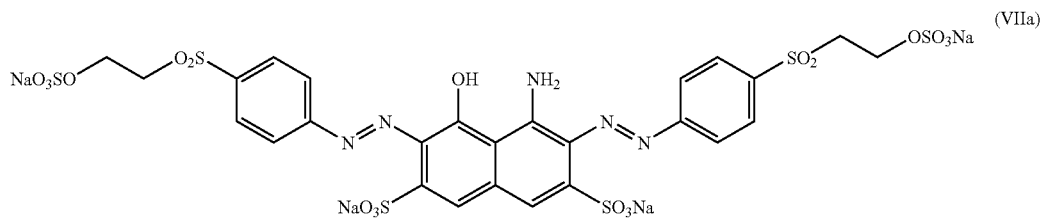

in a 70% fraction. Evaporating the dye solution gives a dye mixture which provides blue dyeings and prints on wool and nylon.

EXAMPLE 13

70 parts of an electrolyte-containing dye powder which includes the blue dye of the formula (Ib)

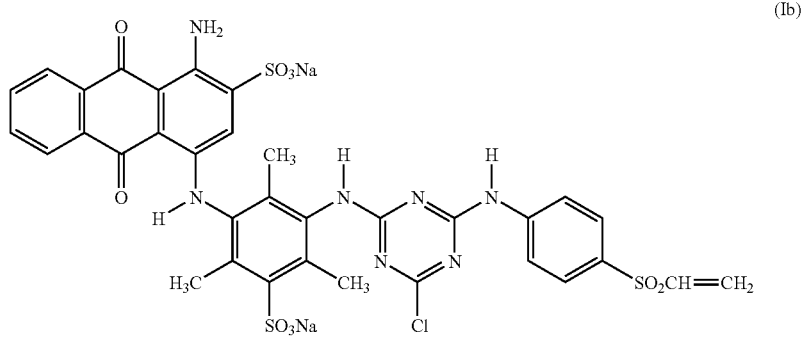

in a 60% fraction, 20 parts of an electrolyte-containing dye powder which includes the blue dye of the formula (IIa) in a 65% fraction and 10 parts of an electrolyte-containing dye powder which includes the blue azo dye of the formula (VIIa) in a 60% fraction are mechanically mixed.

The resulting dye mixture according to the present invention provides blue dyeings and prints on wool and nylon.

DYEING EXAMPLE 1

1 part of the dye mixture of Preparation Example 1 are dissolved in 2000 parts of water and 5 parts of sodium sulfate, 1 part of a leveling assistant (based on a condensation product of a higher aliphatic amine and ethylene oxide) and also 5 parts of sodium acetate are added.

The pH is then adjusted to 4.5 with acetic acid (80%). The dyebath is heated to 5000 for 10 min and is then entered with 100 parts of a woven wool fabric. The temperature is raised to 100° C. in the course of 50 min and dyeing is carried out at 100° C. for 60 min. This is followed by cooling down to 90° C. and removal of the dyed material. The wool fabric is washed with hot and cold water, subsequently whizzed and dried.

The red dyeing obtained has good light- and wetfastnesses and also good levelness in the fiber.

DYEING EXAMPLE 2

1 part of the dye mixture of Preparation Example 1 are dissolved in 2000 parts of water and 1 part of a leveling assistant (based on a condensation product of a higher aliphatic amine and ethylene oxide) and also 5 parts of sodium acetate are added. The pH is then adjusted to 5 with acetic acid (80%). The dyebath is heated to 50° C. for 10 min and is then entered with 100 parts of a woven nylon fabric. The temperature is raised to 110° C. in the course of 50 min and dyeing is carried out at 100° C. for 60 min. This is followed by cooling down to 60° C. and removal of the dyed material. The nylon fabric is washed with hot and cold water, soaped, subsequently whizzed and dried.

The red dyeing obtained has good light- and wetfastnesses and also good levelness in the fiber.

All the dyes of Preparation Examples 2-13 are dyed similarly to Dyeing Examples 1 and 2.

Further dyeing examples (as per Dyeing Examples 1 and 2) to obtain different hues are given in the table examples which follow.

| Dyeing Example | Parts | Dye mixture of Example | Hue |
|---|---|---|---|
| 3 | 0.28 | 2 | dark brown |
|  | 0.8 | 6 |  |
|  | 0.46 | 12 |  |
| 4 | 0.45 | 3 | orange |
|  | 0.4 | 7 |  |
| 5 | 0.4 | 3 | violet |
|  | 0.5 | 12 |  |
| 6 | 0.6 | 7 | green |
|  | 0.6 | 12 |  |
| 7 | 0.45 | 3 | brown |
|  | 0.4 | 12 |  |
|  | 0.7 | 7 |  |

What is claimed is:

1. A yellow-dyeing dye mixture comprising at least one dye of the general formula (V)

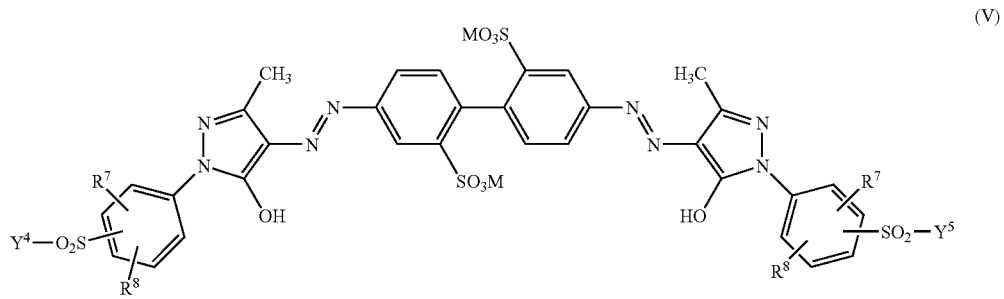

(V)

and at least one dye of the general formula (VI)

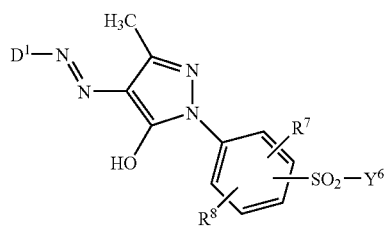

(VI)

where

R$^7$ and R$^8$ represent hydrogen, methyl, methoxy or —SO$_3$M;

Y$^4$, Y$^5$ and Y$^6$ independently represent vinyl or β-sulfatoethyl;

D$^1$ represents a group of the formula

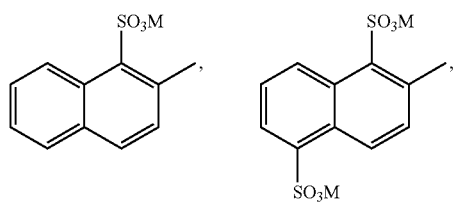

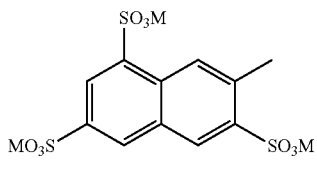

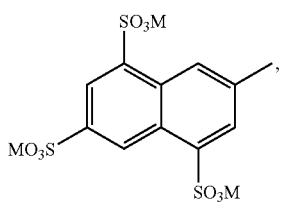

-continued

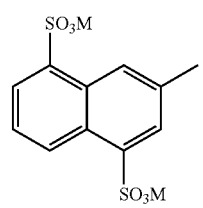

and

M represents hydrogen, sodium or potassium.

2. The dye mixture according to claim 1 comprising a dye of the general formula (IX)

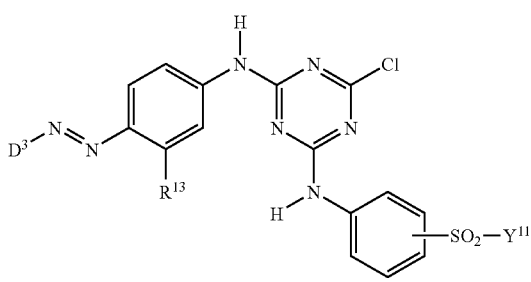

(IX)

where
R$^{13}$ represents (C$_2$-C$_4$)-alkanoylamino, ureido, sulfamoyl or acetyl;
Y$^{11}$ represents vinyl or β-sulfatoethyl; and
D$^3$ has one of the meanings of D$^1$.

3. The dye mixture according to claims 1 or 2 comprising dyes of the general formulae (V) and (VI) wherein
R$^7$ and R$^8$ represent hydrogen;
Y$^4$, Y$^5$ and Y$^6$ represent vinyl or β-sulfatoethyl;
D$^1$ represents a group of the formula

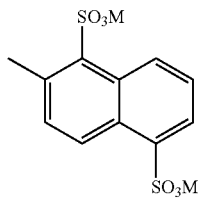

and
M represents hydrogen, sodium or potassium.

4. The dye mixture as claimed in claim 1, wherein the dye of the formula (V) is present in amounts from 10% to 90% by weight and the dye of the general formula (VI) is present in amounts from 10% to 90% by weight, based on the total dye content.

5. The dye mixture as claimed in claim 1, wherein the dye of the formula (V) is present in amounts from 50% to 80% by weight based on the total dye content.

6. The dye mixture as claimed in claim 2, wherein the dye of the formula (V) is present in amounts from 10% to 30% by weight, the dye of the general formula (VI) is present in amounts from 20% to 50% by weight and the dye of the general formula (IX) is present in amounts from 20% to 70% by weight, based on the total dye content.

7. The dye mixture as claimed in claim 3, wherein the dye of the formula (V) is present in amounts from 10% to 30% by weight, the dye of the general formula (VI) is present in amounts from 20% to 50% by weight and the dye of the general formula (IX) is present in amounts from 20% to 70% by weight, based on the total dye content.

8. A process for mono-, di- or trichromatic dyeing and printing of natural and synthetic polyamide fiber material which comprises contacting the material with the dye mixture as claimed in claim 1.

9. The process of preparing the dye mixture as claimed in claim 1, which comprises mechanically mixing the individual dyes.

* * * * *